(12) United States Patent
Osterman (10) Patent No.: US 6,292,140 B1
(45) Date of Patent: Sep. 18, 2001

(54) ANTENNA FOR MILLIMETER-WAVE IMAGING AND BOLOMETER EMPLOYING THE ANTENNA

(75) Inventor: David P. Osterman, Hastings-on-Hudson, NY (US)

(73) Assignee: Hypres, Inc., Elmsford, NY (US)

( * ) Notice: Subject to any disclaimer, the term of this patent is extended or adjusted under 35 U.S.C. 154(b) by 0 days.

(21) Appl. No.: 09/433,151

(22) Filed: Nov. 3, 1999

(51) Int. Cl.[7] .................................................... H01Q 1/38
(52) U.S. Cl. ................... 343/700 MS; 343/879; 343/893
(58) Field of Search ............................. 343/700 MS, 703, 343/718, 725, 728, 879, 893, 913, 769; H01Q 1/38

(56) References Cited

U.S. PATENT DOCUMENTS

| | | | | |
|---|---|---|---|---|
| 5,039,996 | * | 8/1991 | Fockens | ................................. 343/866 |
| 5,171,733 | * | 12/1992 | Hu | ............................................ 505/1 |

FOREIGN PATENT DOCUMENTS

| | | | | |
|---|---|---|---|---|
| 002570494 | * | 3/1986 | (FR) | .................................. G01J/5/20 |
| 59-4206 | * | 11/1984 | (JP) | ................................. H01Q/13/08 |
| 10038695 | * | 2/1998 | (JP) | .................................. G01J/5/02 |

* cited by examiner

Primary Examiner—Don Wong
Assistant Examiner—Shih-Chao Chen
(74) Attorney, Agent, or Firm—Henry I Schanzer, Esq (57) ABSTRACT

The invention relates to a novel antenna which is useful in the manufacture of a bolometer integrated on a silicon chip. An opening in the silicon chip is spanned by two separate thermally, isolated structures. A thin-film antenna, comprising two parts, is located on the structures, with one antenna part on each structure. Radiation received in the larger of the two antenna parts is coupled electromagnetically into the smaller part, where it causes a current to flow. The current is dissipated as heat. A thin-film thermometer measures the temperature rise of the smaller antenna part, due to the dissipated heat. The bolometer achieves improved performance in comparison to previous bolometer designs because the radiation is dissipated in a part of the antenna only, and the bolometer is free from impedance-matching constraints of other designs.

18 Claims, 7 Drawing Sheets

ANTENNA FOR MILLIMETER-WAVE IMAGING AND BOLOMETER EMPLOYING THE ANTENNA

BACKGROUND OF THE INVENTION

This invention relates to radiation detectors and, in particular, to electromagnetic radiation detectors known as bolometers.

Figure 1:
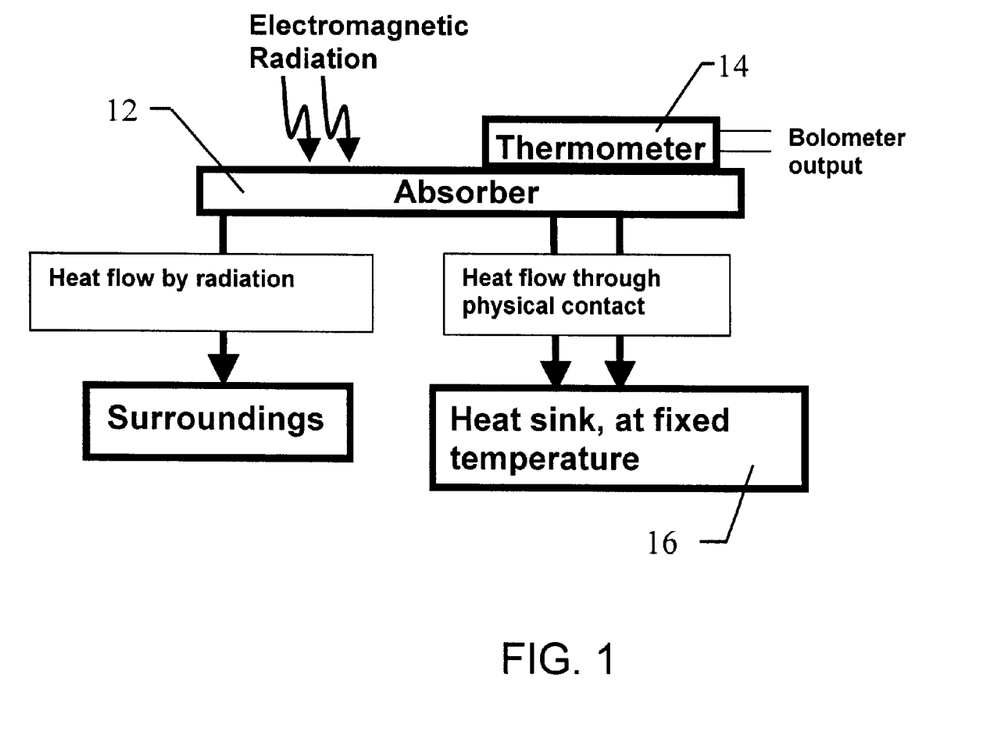
FIG. 1 is a diagram of certain basic components for forming a bolometer, and the heat flow paths associated with the bolometer.

A typical bolometer, as shown in FIG. 1, includes an absorber 12 of electromagnetic radiation, a resistive thermometer 14 and a heat sink 16. The absorber 12 intercepts incident electromagnetic radiation and converts it into heat, thereby raising the temperature of the absorber 12. The thermometer 14 is in thermal contact with the absorber 12 and measures its temperature rise. The thermometer 14 is normally selected to be of a material which has a temperature-dependent resistivity. Therefore, by connecting (and biasing) the thermometer in an electric circuit, it produces a voltage indicative of the temperature of the absorber. This voltage is the "bolometer" output, which may be calibrated to indicate the absorbed radiation power or, alternatively, to indicate incident radiation power.

In a steady state condition, the heat flow out of the absorber is equal to the incident radiation absorbed by it. The heat flows out along several paths. As shown in FIG. 1, some heat flows by conduction through a path that physically connects the absorber to the heat sink 16, which is a body that is maintained at relatively fixed temperature. Also, as shown in FIG. 1, some heat is radiated out of the absorber and thermometer by radiation conduction to the surroundings. Heat flow through an ambient gas can be minimized by operation in a vacuum.

The thermal conductance, $G_{heat\ sink}$, from the absorber to the heat sink is defined as the ratio of steady state heat flow between these elements, divided by their temperature difference, in the absence of any other heat flows in the system. Similarly, a thermal conductance $G_{rad}$ may be defined as the ratio of steady state heat flow between the absorber and surroundings, divided by their temperature difference, in the absence of any other heat flows in the system.

The total thermal conductance G of the bolometer is the combined thermal conductance through all paths of heat flow from the absorber and thermometer to the heat sink and surroundings. It is given by:

$$G = G_{heat\ sink} + G_{rad} \quad (1)$$

where $G_{heat\ sink}$ and $G_{rad}$ are as defined above. When the total thermal conductance G is made smaller, the temperature rise of the absorber will be greater for a given amount of absorbed radiation, and more signal will be available to the thermometer. It is therefore an object of this invention to reduce the total thermal conductance, G, which is defined in equation 1. It is also an object of this invention to accomplish this while maintaining the fastest time response of the bolometer, i.e. the shortest time constant.

The thermal conductance due to radiation $G_{rad}$ is given by:

$$G_{rad} = 4\eta\sigma a T_0^4 \quad (2)$$

where η is the emissivity, σ is the Stefan-Boltzmann constant, "a" is the total area of the absorber and other bolometer parts whose temperature can vary, and $T_0$ is the temperature of the surroundings.

The time constant τ of the bolometer characterizes the length of time to respond to a change in incident power level. Ignoring the effects of self-heating due to the thermometer bias, it is given by:

$$\tau = C/G \quad (3)$$

where C is the thermal capacitance of the bolometer.

Responsivity is defined as the ratio of the bolometer output to the power incident on the bolometer, and may be expressed in units of Volts/Watt. Ignoring the effects of self-heating, the zero-frequency responsivity increases in inverse proportionality to the total thermal conductance G. Thus, a smaller value of G is desirable for achieving a larger value of responsivity. A smaller value of G also generally results in improved sensitivity.

According to Eq. (1), the value of G can be reduced by decreasing one of its components, $G_{heat\ sink}$. This may be done by making a long structure, with narrow cross section, as the link between the absorber and heat sink. The other component contributing to the total thermal conductance, $G_{rad}$ is then a limit on how large the responsivity can be. Equation (2) shows that, for a given surrounding temperature $T_o$ and emissivity η, the bolometer area "a" will be a limiting factor in responsivity. With the other parameters already specified, minimizing the area "a" will be the principal means for achieving maximum responsivity. The area of the bolometer is also critical for determining the time constant. In general, the thermal capacitance C decreases with the bolometer area. Therefore, according to Eq. (3), the time constant also decreases with decreasing area. A smaller area "a" is therefore desirable for achieving a faster time response, as well as increasing the responsivity.

Taking into account the heating of the bolometer due to thermometer bias current introduces a correction to Eq. (3). However, it is still true that a smaller bolometer area results in a faster time response and permits a higher responsivity to be obtained.

Figure 2A:
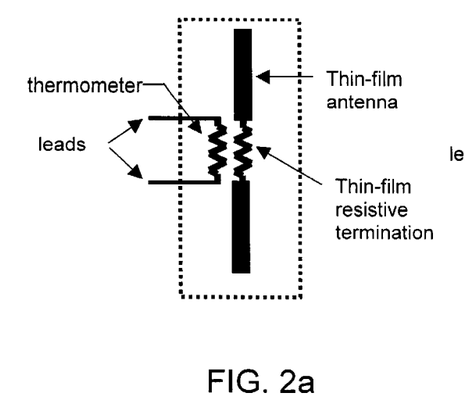
FIGS. 2(a) and 2(b) are diagrams of two prior art bolometers employing antenna absorbers.
Figure 2B:
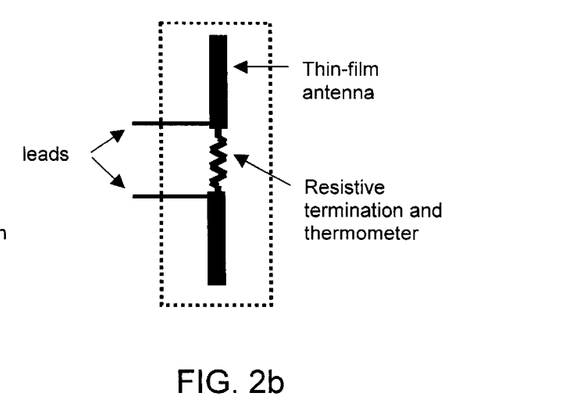
Figure 3A:
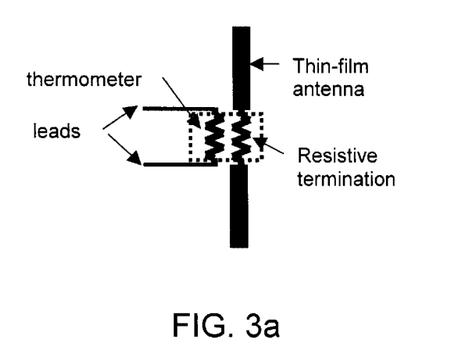
FIGS. 3(a) and 3(b) are diagrams of two other prior art bolometers employing antenna absorbers.
Figure 3B:
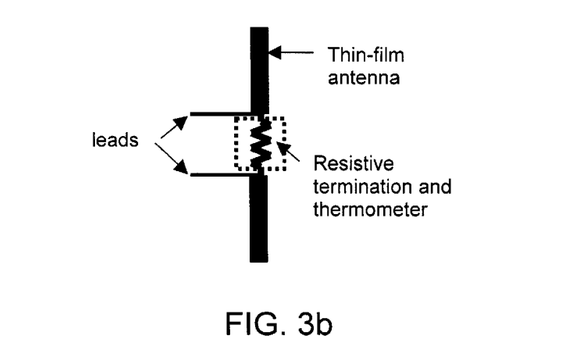

FIGS. 2 and 3 show prior art bolometers employing absorbers based on antennas. The bolometers in FIG. 2a and FIG. 2b include physical structures with a low thermal conductance between the entire absorber and the heat sink. The dotted line indicates the perimeter of a structure with low thermal conductance to the heat sink, such as a membrane. All parts within the dotted line are located on this structure. In FIG. 2a, incident radiation, received by the antenna, is delivered to a thin-film resistor at the antenna feed. Joule-heating within the resistor converts the radiation to heat. An adjacent resistive thermometer (which may be part of a bridge circuit) measures the temperature rise. In FIG. 2b, which is a different version of the configuration shown in FIG. 2a, the resistor at the antenna feed plays two roles; thermometer and converter of radiation to heat. One way of reducing the total thermal conductance of the bolometers in FIG. 2 is by suspending the absorber and thermometer on a membrane. The perimeter of the membrane makes direct contact to a thicker structure (not shown) which functions as the heat sink. The relatively small cross-section for heat flow through the membrane results in a small value of the thermal conductance ($G_{heat\ sink}$) through the membrane. However, this strategy is limited by the other component of thermal conductance, $G_{rad}$. The area of the bolometer that enters into $G_{rad}$, which may be calculated in accordance with equation 2, includes the entire area of the antenna, and cannot be made any smaller than the antenna. Thus, there is a limit on how small $G_{rad}$ can be, which in turn limits the total thermal conductance G.

This constraint on the bolometer designs of FIGS. 2a and 2b is especially limiting for bolometers that detect millimeter-wave radiation. Antennas for these wavelengths are millimeters in length and a fraction of a millimeter in width, resulting in a thermal radiation conductance $G_{rad}$ that is quite large, particularly when the surroundings are at room-temperature.

FIGS. 3a and 3b also show two configurations of bolometers with antenna absorbers. In these configurations, the thermometer (but not the antenna) has a low thermal conductance to the heat sink. The parts within the dotted line are located on a structure, such as an "air-bridge", with low thermal conductance to the heat sink. The parts outside of the dotted line are located on the heat sink. Thus, in contrast to FIGS. 2a and 2b, the antenna is located on the heat sink. In FIG. 3a, only the resistive termination at the antenna feed, and an adjacent thermometer are suspended on a low thermal conductance structure. In FIG. 3b, the resistive termination and thermometer are combined in a single resistor. This configuration has been implemented in an "air-bridge" configuration, with the resistor on a small bridge standing above a silicon substrate. It has also been implemented with a thermocouple-type thermometer.

However, there is a drawback to the configurations of FIG. 3 which limits the highest responsivity that can be achieved. The electrical impedances of the antenna and its resistive termination must be substantially equal, to achieve optimal coupling of radiation from the former to the latter. Typical antenna impedances are in the range of hundreds of Ohms. However, this constraint on the electrical impedance of the termination resistance also constrains its thermal conductance. This is because of the Weideman-Franz law, according to which the electrical and thermal impedances are related through a proportionality constant that is independent of the material, for a wide range of conductive materials. The thermal impedance of the termination is therefore specified by its electrical impedance. This is a limit on the thermal conductance, and the bolometer responsivity. It is an object of the invention to reduce these constraints.

SUMMARY OF THE INVENTION

The invention resides, in part, in a novel antenna absorber for capturing incident electromagnetic radiation. The antenna includes first and second sections which are physically separated to reduce heat conduction between the two sections. However, the first and second sections are designed to ensure that there is significant electromagnetic coupling between the two sections. The first section is generally larger than the second section and is designed for receiving desired electromagnetic radiation while undergoing little heat rise. The second section is adapted to receive radiation from the first section by electromagnetic coupling and for converting its received electromagnetic radiation to heat. Specifically, the antenna is designed so that the electromagnetic energy received by the antenna is dissipated primarily in the second, smaller, section. The resultant temperature rise is therefore largely confined to the smaller, second, section.

In one embodiment, the second section of the antenna is a closed ring like structure and the first section of the antenna is a bent line that surrounds a large portion of the second section, with the first and second sections being formed on two separate suspended structures.

The invention also resides in a novel structure and method for coupling the antenna to a thermometer for producing a bolometer which can achieve better performance than known bolometers. In accordance with the invention, the thermometer is located in close physical proximity to the second section of the antenna so as to sense the temperature rise of the second section and the area of the structure on which the thermometer is located is made very small to reduce the thermal conductance due to radiation conduction and also to reduce the time constant of the bolometer.

In one embodiment of the invention, a bolometer comprises patterned thin films formed on two structures that are separately suspended over an opening in a silicon wafer. The first radiation-receiving section of the antenna is formed on one suspended structure and the second, smaller, section and a thin film thermometer are formed on the other suspended section. The electromagnetic radiation received in the first section is electromagnetically coupled to the second section and converted into heat causing the temperature of the second section to rise and the thermometer to measure the temperature rise. The silicon in the wafer functions as the bolometer's heat sink. The suspended structure on which the thermometer is located is designed to have a low thermal conductance to the heat sink. This increases the temperature rise resulting from the dissipated heat.

The invention is especially advantageous for the detection of millimeter-wavelength radiation, however it can be used for other wavelengths, as well. Bolometers embodying the invention may be operated at, above, or below room temperature.

Arrays of bolometers may be produced on a single silicon chip, or several chips for imaging millimeter-wave radiation, or radiation at other wavelengths. Microelectronic fabrication techniques permit the inexpensive production of arrays of bolometers, in parallel, with high uniformity and high yield.

BRIEF DESCRIPTION OF THE DRAWINGS

In the accompanying drawing like reference characters denote like components.

DETAILED DESCRIPTION OF THE INVENTION

Figure 4:
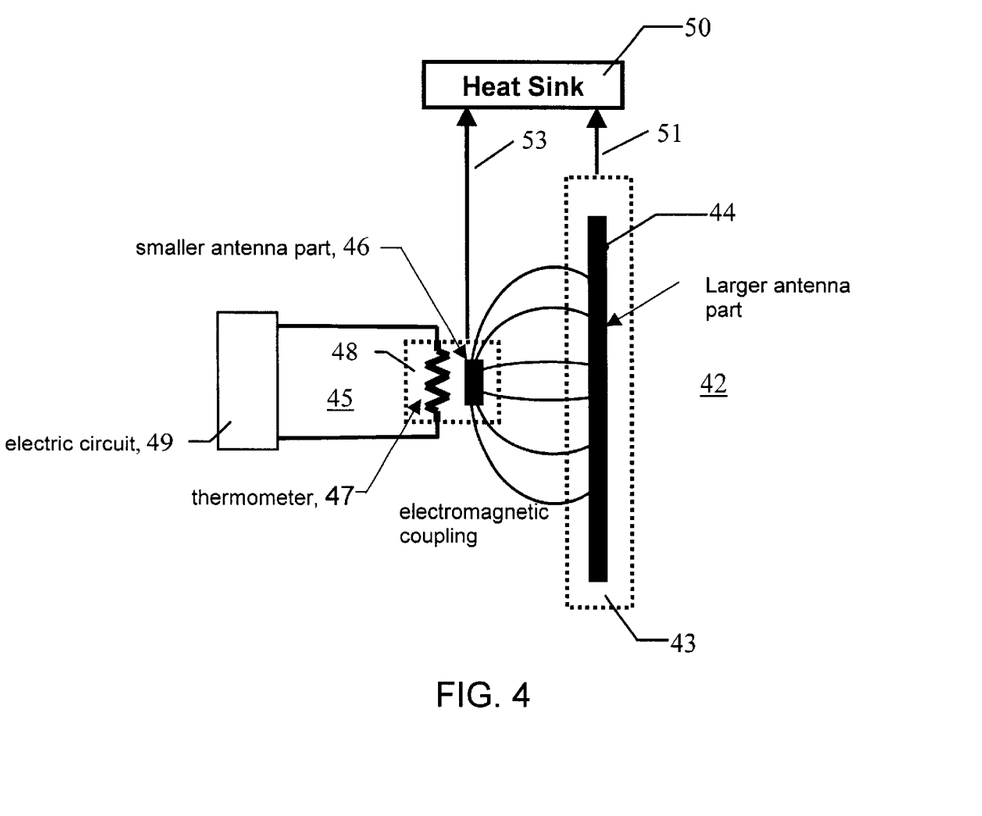
FIG. 4 is a simplified schematic diagram of the components of a bolometer embodying the invention.

FIG. 4 is a diagram illustrating the components of a bolometer embodying the invention. The bolometer includes two structures (42,45) that are separately connected to a heat sink 50; dotted lines show the outer perimeters of the two structures. The first structure 42 includes a first patterned membrane 43 on which is formed a first antenna section 44. The antenna section 44 is specifically designed to capture incident electromagnetic radiation within a particular wavelength band. The second structure 45 includes a second patterned membrane 48 on which is formed a second antenna section 46 and the resistive portion 47 of a thermometer. Arrows labelled 51 and 53 show heat flow from structures 42 and 45 to the heat sink. The first antenna section 44 and the underlying patterned membrane 43 are made larger than the second antenna section 46 and the patterned membrane 48. Although the first and second sections are physically separated, they are tightly coupled electromagnetically so that the power received by the first antenna section 44 gets transferred to the second antenna section 46. This electromagnetic (i.e., inductive) coupling is a designed feature of the antenna. The power transferred to the second antenna section is converted to an equivalent quantity of heat (except for losses) equal to the power received by the first antenna section 44. The resistor 47 (also referred to herein as "the thermometer") has an ohmic value which varies as a function of the temperature rise due to heat generated by the second antenna section 46. Resistor 47 may be part of any suitable circuit 49 (e.g., a wheatstone bridge, or any appropriate circuit) for producing a current and/or a voltage indicative of the temperature rise due to the heat generated by the second antenna section 46.

Figure 5:
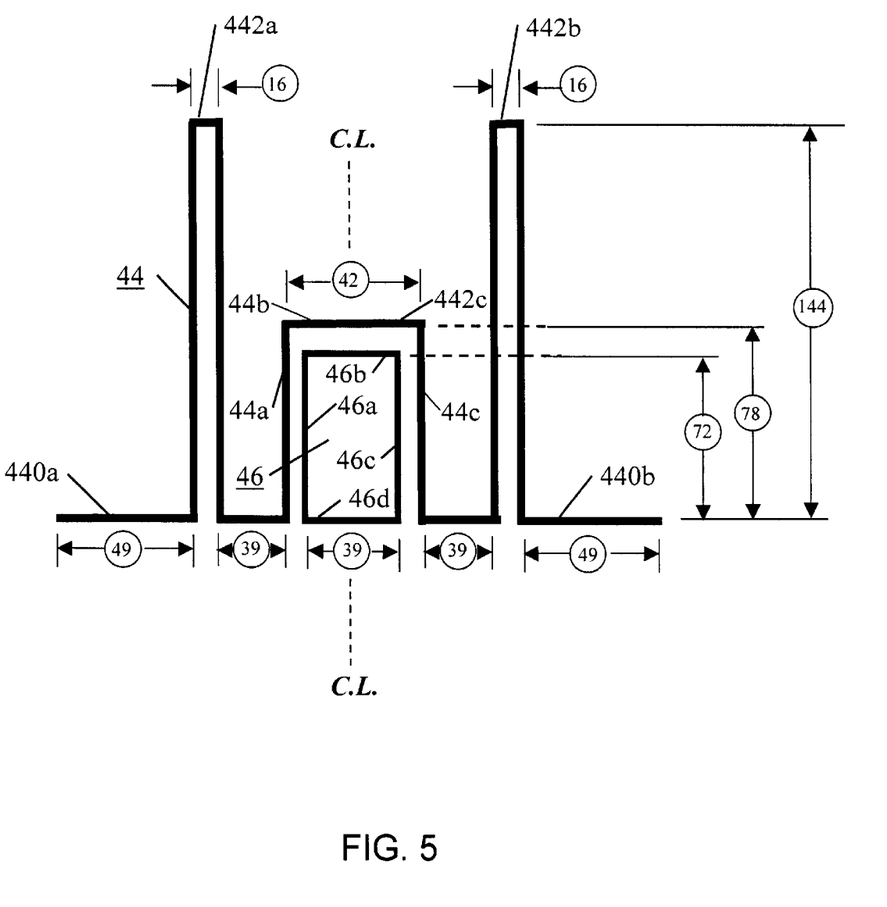
FIG. 5 is a top view of an antenna embodying the invention.
Figure 6:
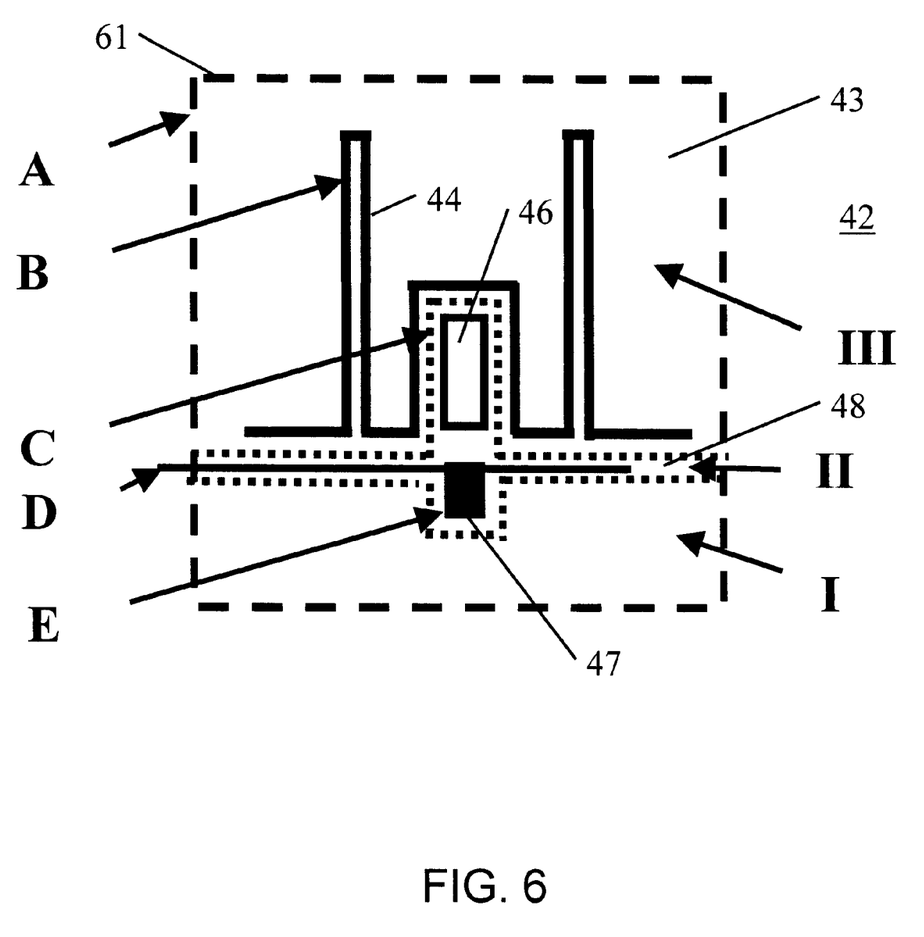
FIG. 6 is a top view of an antenna embodying the invention with a thermometer forming a bolometer embodying the invention.
Figure 7:
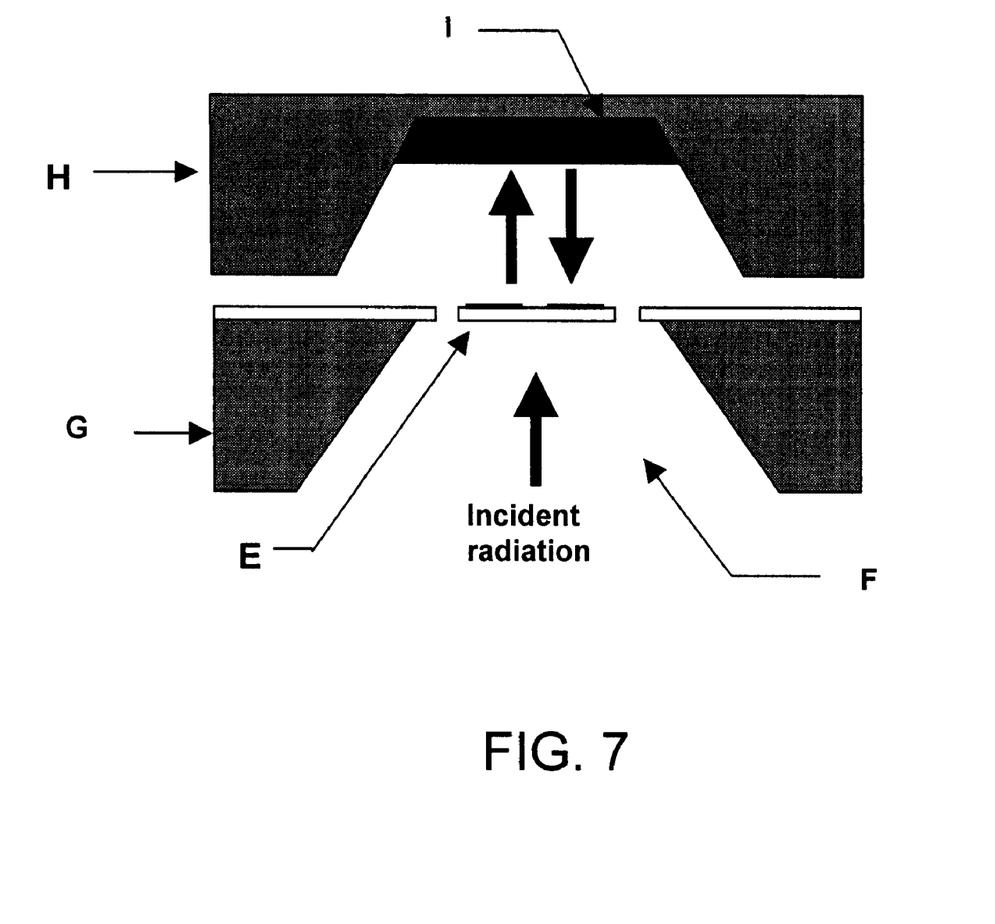
FIG. 7 is a cross section of a silicon chip for forming the bolometer of FIG. 6 with a thin film mirror formed on a separate adjacent substrate.

As shown in FIGS. 5–7, the bolometer may be formed on a silicon chip which includes a rigid membrane formed over an opening in the chip with thin films patterned and deposited on the membrane, and with a metallic mirror behind the chip. The patterned thin films on the membrane define the two parts of an antenna and a resistive element to form a "thermometer", and the thermometer's leads. Parts of the membrane are removed and an incision is made in the remaining portion of the membrane to separate the two antenna parts. A suitable material for the membrane is amorphous silicon nitride, which is sufficiently robust, in thicknesses of approximately 0.1 to 1 micrometer.

FIG. 5 shows a top view of a thin film antenna embodying the invention. The antenna consists of the two parts 44 and 46 which are physically separated while being tightly coupled to each other electromagnetically. The first antenna section 44 (also referred to as a "bent line") surrounds a major part of the second section 46 which is shown to be a closed rectangular "ring" structure.

Electromagnetic radiation received by the bent line 44 is coupled into the closed rectangular ring 46, causing current to flow around the ring. Power is dissipated in the rectangular ring by joule heating causing a rise in its temperature. The first antenna section 44 may be formed of low resistivity conductive material, such as gold. The first antenna section consists of a single continuous "bent" line shaped to form three inverted "U" like shapes. The central "U" like shape 442c is shorter than the two external "U" like shapes 442a and 442b and is wider than they are in order to wrap around a large portion of the rectangular ring-like structure 46. The closed rectangular structure shown in FIG. 5 provides good electomagnetic coupling. Three sides of the rectangular structure 46a, 46b, and 46c are formed close to the three sides 44a, 44b, and 44c of the first antenna section. The rectangular ring may be made of a conductive material (with a resistivity much greater than gold, such as titanium or niobium). Note that the rectangular ring is inductively coupled to the first section and that the first and second sections form the "antenna". FIG. 5 thus shows a thin-film antenna, embodying the invention, in which radiation received in the bent line is coupled electromagnetically into the closed rectangular ring, causing a current to flow and power to be dissipated in the ring. In one embodiment of the invention, the antenna was designed for operation at a center frequency of 217 GHz. For that frequency of operation the elements of the antenna had the dimensions shown circled in FIG. 5; with all dimensions being in micrometers ($\mu$m). The width of the lines forming the rectangular ring (46a, 46b, 46c, and 46d) and the width of the three adjacent lines (44a, 44b and 44c) were made 3 micrometers wide; all other lines were made 6 micrometer wide. Note the symmetry of the antenna section 44 and the antenna section 46 about the center line (c.l.). Antennas with center frequencies other than 217 GHz may be designed with different dimensions suitable for the desired range of operation.

The bent line 44 is made of a conductive film that is thicker than the skin depth at the frequency of interest, to minimize dissipative losses, where the skin depth is the distance from the conductive film's surface to the plane where the amplitude of an incident electromagnetic wave goes to 37 percent of its value at the conductive film's surface. The rectangular ring however is made of a film whose thickness and width is set to satisfy the antenna design, which requires an impedance around the ring in the range of tens to hundreds of Ohms. These design criteria determine that the sheet resistance in the antenna ring is much greater than that of the bent line. Thus, most of the resistive dissipation in the antenna occurs in the rectangular ring.

FIG. 6 is a top view of the antenna and a "thermometer" formed on a silicon chip and FIG. 7 is a cross sectional view of the silicon chip with a "backing" mirror on a separate chip. The perimeter 61 of the bolometer structure is defined by dashed lines. The perimeter is defined by the edge of a rigid membrane suspended over a rectangular opening in a silicon, or other, substrate. The rigid membrane includes three regions identified as I, II and III in FIG. 6. Region III includes the first antenna section which is a thin film antenna defined by the bent line 44. Region II includes the rectangular ring thin-film section 46 and the thermometer resistive portion 47. The dotted line between regions II and III is meant to indicate that these two regions are separated (i.e., by making an incision in the membrane or by any other suitable separating arrangement). In FIG. 6, region I is bounded by dashed lines along the bottom and the right and left sides and by a dotted line on its top side. The membrane is entirely removed in region I. The cross section of the silicon chip shown in FIG. 7, shows the bolometer's substrate G with the patterned and incised membrane E suspended over an opening F in the substrate. Also shown is a second chip H placed behind (or above) the first chip with a thin reflective film I that acts as a "mirror" for incident radiation. The membrane E may be made of amorphous silicon nitride, while layer I is a reflector surface to increase performance of the antenna.

The opening in the silicon chip has a rectangular perimeter (FIG. 6). The membrane covering the opening is removed in one region (region I, in FIG. 6). The remaining membrane is separated into two parts, (labeled II and III in FIG. 6) by an incision. The thin film antenna is located on the membrane such that the two separate antenna parts lie on the two separated parts of the membrane. A thin-film resistive thermometer 47 is located on the same piece of membrane 48 as the rectangular ring 46 of the antenna.

The temperature of the silicon chip is stabilized by contact between the back of the chip and an object of regulated temperature. The silicon in the chip is therefore the bolometer heat sink. Heat dissipated in the antenna ring flows to the heat sink through the patterned membrane part (region II of FIG. 6). The thermal conductance of this path is small because of the small thickness of the membrane and the low thermal conductivity of amorphous silicon nitride. This thermal conductance may be further reduced by choosing a long narrow aspect for the perimeter of region II in FIG. 6. The long narrow aspect will connect the thermometer to the heat sink.

The design requires both parts of the antenna to be on a rigid membrane of the same material and thickness. This eliminates impedance discontinuities due to changes in substrate, which would otherwise interfere with good electromagnetic coupling between the two antenna parts. The thickness of the membrane (0.1 micrometer to 1 micrometer) is small relative to the antenna dimensions. As a result, a relatively small fraction of the electromagnetic field pattern from the antenna passes through the substrate. This reduces absorption in the substrate, and contributes to a field pattern that is smooth and similar to the pattern of an antenna in free space. These advantages of the rigid membrane could be obtained with other membrane materials besides amorphous silicon nitride. While the resistive thermometer is one embodiment, there are other thin-film thermometer types that could be used to measure the temperature rise, including a thermocouple, thermopile or pyroelectric material.

An additional improvement in response can be gained by etching away the membrane material inside of the rectangular ring. This will not affect the coupling, or other characteristics of the antenna. It will, however reduce the thermal mass and radiation conductance of the structure on which the thermometer is located. As a result, the time constant will decline (i.e. the bolometer will respond more quickly) and the responsivity will increase.

A reflective surface behind the silicon chip serves to increase the antenna efficiency. The center frequency of the antenna may be tuned slightly by changing the distance from the antenna to the reflective surface. One implementation of the reflective surface which is especially useful for an array of bolometers, is shown in FIG. 7. A second "backing" chip is placed behind the bolometer array chip. The backing chip has a separate reflective surface for each bolometer in the array, and located behind each bolometer. The reflective surface is a metallic film deposited on the flat bottom of a pit in the backing chip.

FIG. 7 shows the cross section of a silicon substrate on which are formed the components of a bolometer and behind which is formed a backing substrate, with a thin film mirror that increases the efficiency of the antenna. Incident radiation is introduced into the bolometer through the opening in the bolometer's substrate as shown in the figure.

The bolometer may be fabricated by standard "bulk micromachining" processing methods. First, amorphous silicon nitride (or a silicon nitride—silicon oxide composite layer) is deposited on both sides of a [100]-cut silicon wafer by chemical vapor deposition (CVD). Next, a rectangular opening in the silicon nitride is made in the back of the wafer by reactive ion etching (RIE). Then the wafer is immersed in an anisotropic liquid etchant, such as a potassium hydroxide (KOH) solution. This material etches silicon but has a comparatively negligible etching effect on amorphous silicon nitride. It is also an anisotropic etchant for silicon, producing etch pits with four sloping walls in a [100]-cut silicon wafer, as shown in FIG. 7. Etching of the exposed silicon proceeds from the back of the wafer until the silicon nitride is encountered on the front of the wafer, leaving a silicon nitride membrane over a rectangular opening in the wafer. Thin films are then deposited and patterned to form the antenna, thermometer, and leads to the thermometer. The membrane is then incised, and removed in part by RIE, to achieve the configuration of FIGS. 5, 6 and 7. The order of these steps may also be changed. A silicon substrate with a crystallographic orientation other than [100] may also be used resulting in openings behind the antenna with a variety of shapes.

A substrate with an array of reflective mirrors may be fabricated by a process with the same steps as the bolometers, up to the creation of the silicon nitride membranes. At that point, another film that is reflective at the wavelength of interest, is deposited over the side of the wafer with the etched pits. This produces reflective backing mirrors on the membrane at the bottom of each etch pit.

Figure 8A:
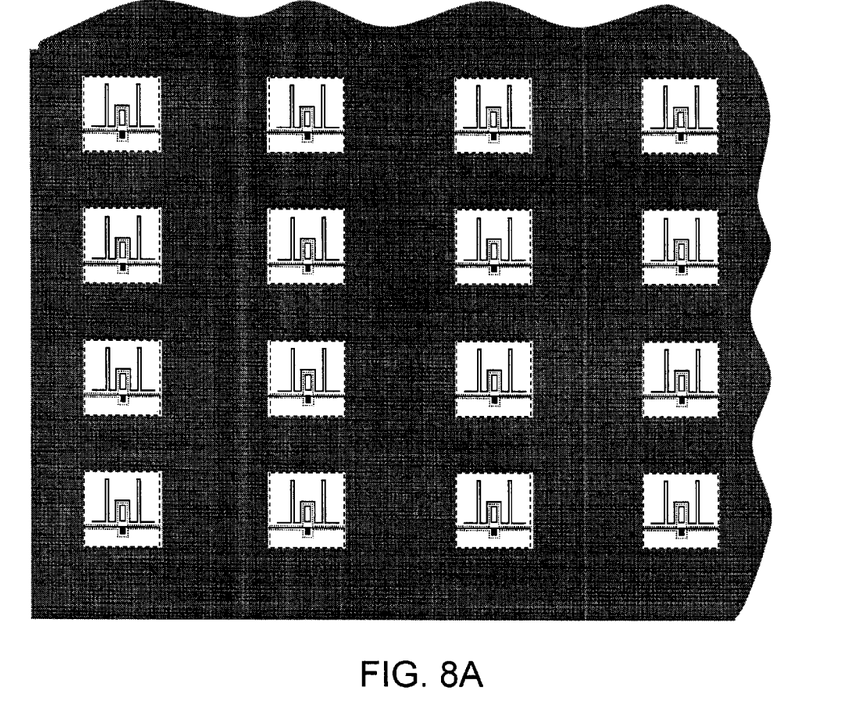
FIG. 8A is diagram of a top view of a portion of a two dimensional array of bolometers embodying the invention.
Figure 8B:
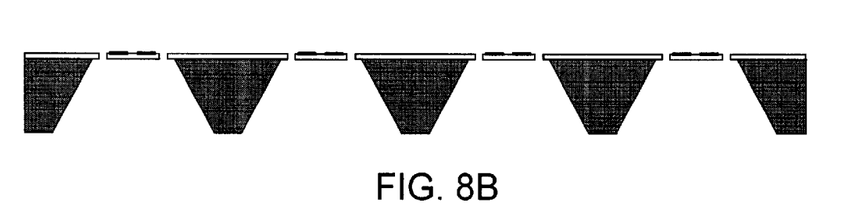
FIG. 8B is a cross section of one row of the array of FIG. 8A.
Figure 8C:
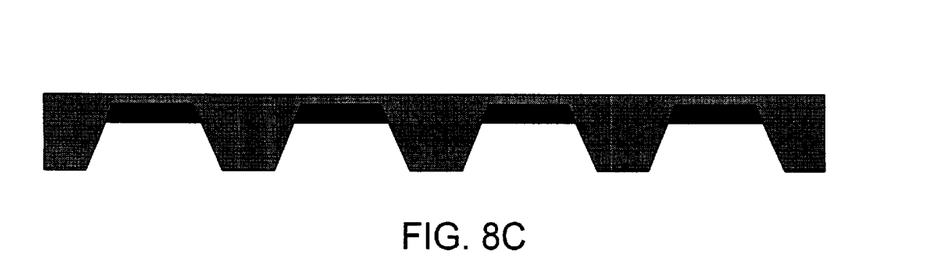
FIG. 8C is a cross section of one row of "backing" mirrors for the array of FIGS. 8A and 8B.

As shown in FIGS. 8A and 8B, bolometers formed in accordance with the invention may be formed such that a linear or two dimensional array of these devices may be formed on a silicon chip. FIG. 8A shows a top view of a portion of a two dimensional array of bolometers. The array could be comprised of "R" rows and "C" columns, where R and C are integers greater than 1. The thermometers of the bolometers of the array could be directly connected to circuitry (not shown), or they could be multiplexed to any suitable circuit (not shown) for sensing the "temperature" and hence the energy absorbed by each bolometer of the array. FIG. 8B is a cross section of one row of the array of bolometers of FIG. 8A, and FIG. 8C is a cross section of one row of an array of "backing" mirrors formed on a separate substrate than the one on which the antennas and the thermometers are formed. In general, the array could be formed using processes and methods discussed above for FIGS. 5–7. Such an array may be used for area imaging.

Bolometers embodying the invention, whether formed as part of an array and operated as such, or operated as individual devices may be employed in numerous different applications for millimeter-wave imaging, especially for passive imaging that detects the emitted or reflected radiation from objects. Because millimeter-waves are not highly attenuated by fog, haze, clouds or smoke, a millimeter-wave imager will enable imaging through these media. Such an imager can therefore serve as an aid for landing or taxiing aircraft in fog, haze, or low clouds. For similar reasons, it can aid in seeing objects obscured by thick smoke during a fire, including the fire itself. Millimeter waves have been shown to be useful in forming images of metals concealed underneath clothing, due to the high reflectivity of the metal and the penetration of millimeter waves through clothing. Images can be obtained of the earth, water bodies and the atmosphere, by remote sensing of passively emitted millimeter waves. The imager can be mounted on an aircraft, satellite, or land. Such remotely sensed images can provide information about resources. Buried mines can also be imaged through porous material such as sand.

What is claimed is:

1. An antenna comprising:

first and second electromagnetically coupled portions;

said first portion comprising a closed loop structure of a first conductive material;

said second portion comprising a bent line of a second conductive material; said bent line for receiving incident electromagnetic radiation and surrounding a large portion of the closed loop structure for electromagnetically coupling and transferring its received energy onto said closed loop structure, said first antenna portion for converting into heat the electromagnetic radiation transferred to it by the second antenna portion.

2. The antenna as claimed in claim 1, wherein said closed loop structure is located in its own separate structure, thermally isolated, from said bent line.

3. The antenna as claimed in claim 1, wherein said closed loop structure is rectangular.

4. The antenna as claimed in claim 1, wherein said bent line is an open ended continuous line, shaped to form three contiguous inverted "U" like shapes extending from a horizontal line, the three U shapes including two outside inverted U shapes being longer and narrower than a central U shape, with the central U like shape surrounding the closed loop structure.

5. The antenna as claimed in claim 4, wherein the antenna is symmetrical relative to a line running through the center of the central U shape.

6. The antenna as claimed in claim 1, wherein said closed loop structure is designed to be more resistive than the bent line for dissipating substantially all the heat generated in the antenna within the closed loop structure.

7. The antenna as claimed in claim 1, wherein said first and second portions are physically and thermally isolated from each other, while the closed loop structure is electromagnetically coupled to the bent line.

8. The antenna as claimed in claim 1, further including temperature sensing means located in close physical proximity to said first portion for sensing the heat dissipated within the closed loop structure and providing an indication of its temperature.

9. The antenna as claimed in claim 8, wherein said temperature sensing means includes a resistive element through which a current can flow, generating a voltage whose amplitude is a function of the heat generated by said closed loop structure.

10. The antenna as claimed in claim 1, wherein the first portion is substantially smaller than the second portion and is designed to have a low thermal time constant.

11. The antenna as claimed in claim 1, wherein the second conductive material is a conductive film of low resistivity material; and wherein the first conductive material is a conductive film of higher resistivity, lower conductivity, material than the second conductive material.

12. The antenna as claimed in claim 11, wherein the radiation coupled from the second portion to the first portion causes a current to flow and power to be dissipated in the closed loop resulting in a temperature rise in the first portion proportional to the radiation coupled from the second portion to the first portion.

13. The antenna as claimed in claim 11, wherein the conductive film of the bent line is thicker than the skin depth at the frequency of the radiation which the antenna is designed to receive and absorb; and wherein the conductive film of the closed loop has a thickness and conductivity to produce a resistance which is much greater than the resistance of the bent line.

14. An antenna comprising:
first and second sections electromagnetically coupled to each other; the second section comprising a closed polygonal structure, for receiving electromagnetic radiation, being physically larger than the first section; the first and second sections being arranged such that the second section surrounds a large portion of the first section for ensuring significant electromagnetic coupling between the two sections; the first and second sections being physically separated to reduce heat conduction between the two sections, the second section formed of a second conductive material for receiving desired electromagnetic radiation while undergoing little temperature rise, and the first section formed of a first conductive material for electromagnetically receiving radiation from the second section and for converting its received radiation to heat resulting in a temperature rise in the first section proportional to the electromagnetic radiation received by the second section and coupled from the second section to the first section.

15. The antenna as claimed in claim 14, wherein said closed polygonal structure is rectangular; and wherein the first conductive material is less conductive than the second conductive material.

16. An array of antennas comprising:
"R" rows and "C" columns of antennas defining R×C locations; where R and C are integers greater than 1;
each one of the R×C locations including an antenna comprised of first and second sections; the second section for receiving radiation of a desired frequency and the first section comprising a closed loop electromagnetically coupled to the second section for receiving energy from the second section and for converting that energy to heat and causing an increase in the temperature of the first section proportional to the radiation received by the second section and coupled to the first section, with the second section being, physically separated from the first section.

17. The array of antennas as claimed in claim 16, wherein said array is a two dimensional array formed on a single silicon chip.

18. The array of radiation absorbing antennas as claimed in claim 17, wherein said first section includes a thin film antenna section formed of a continuous open ended bent line physically surrounding a large portion of the second section for providing good inductive coupling between the first and second sections.

* * * * *